April 16, 1963 D. N. SHARMA 3,086,078

SOUND REPRODUCING SYSTEMS FOR TELEVISION, RADIO AND THE LIKE

Filed Oct. 6, 1959 2 Sheets-Sheet 1

INVENTOR

Devendra Nath Sharma,

BY John B. Brady

ATTORNEY

April 16, 1963 D. N. SHARMA 3,086,078

SOUND REPRODUCING SYSTEMS FOR TELEVISION, RADIO AND THE LIKE

Filed Oct. 6, 1959 2 Sheets-Sheet 2

INVENTOR

BY Devendra Nath Sharma,

John B. Brady ATTORNEY

United States Patent Office 3,086,078

Patented Apr. 16, 1963

3,086,078

SOUND REPRODUCING SYSTEMS FOR TELEVISION, RADIO AND THE LIKE

Devendra Nath Sharma, 22 Carroll House, Gloucester Terrace, London, England

Filed Oct. 6, 1959, Ser. No. 844,813
Claims priority, application Great Britain Oct. 6, 1958
5 Claims. (Cl. 178—7.9)

This invention relates particularly to sound reproducing systems and associated constructional means in television, radio, radiogram and other sound reproducing systems.

The main object of the invention is to provide construction means by the association of the sides constituting the cabinet to incorporate a cavity, an opening, a channel, a labyrinth, a collector or a sound waveguide conforming exponentially or otherwise as a channel coupled to a sound reproducing source for guiding sound to be led to the flared opening or space at present occupied in a television receiver by the opaque mask around the cathode ray tube viewing screen.

Such "horn" or sound channel or waveguide may be constructed separately from the cabinet or in association therewith, provision being made for mounting the sound reproducing source by a flexible easily detachable joint, and finally flaring at the space which is at present occupied by the sound-opaque cathode ray-tube picture mask adjacently around the cathode ray tube.

Another object of the invention is to provide constructional means for incorporating the chassis of the set alone or in association with the enclosing cabinet in a television receiver in a manner so far not utilized by anybody, by employing the space between the cabinet and the cathode ray tube screen. Said mask space being provided with perforations, flared opening, louvres, slots or by direct coupling via an enclosed sound waveguide or air-space to any type of sound reproducer or speaker such as reed, electrostatic, electromagnetic or other types, one or several in numbers, to enable the sound to issue from one, two, three sides of the tube or all around the cathode ray tube, to render the effect as if the sound were issuing directly from the cathode ray tube viewing screen.

These means enable the receivers and their construction to be made more efficient with better sound directional effects, improved stereophonic effects, better in appearance, performance and design, and considerable saving of cost in manufacture, and more power output for sound for a given input in comparison with methods already used by manufacturers.

Other and further objects of my invention reside in improved television, radio or radiogram cabinets as set forth more fully in the specification hereinafter following by reference to the accompanying drawings, in which, FIGURE 1 is a perspective view of a television set which refers to the already known and several employed means of sound reproduction all over the world in order to distinguish the principles and constructional means embodied and underlying my invention;

Figure 5:
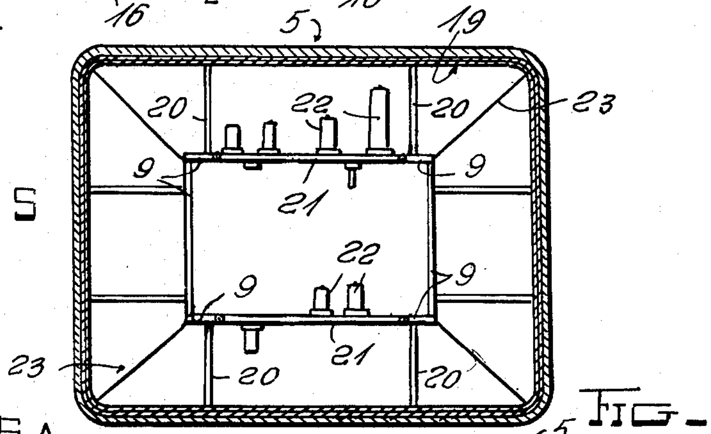
Figures 6, 6A:
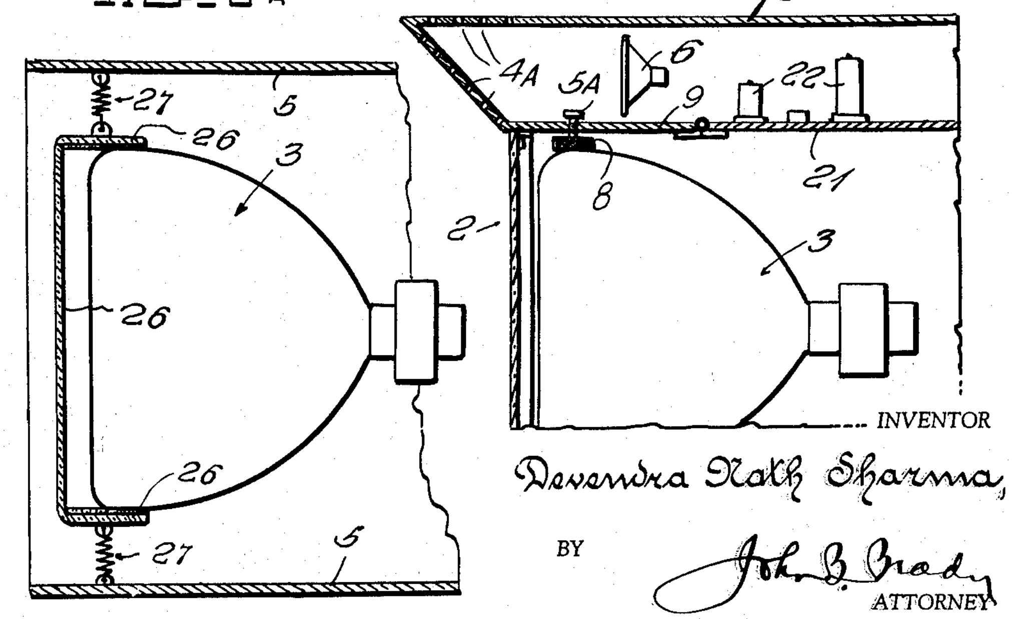

FIGURE 5 is a vertical sectional view through the back of the television chassis showing constructional means of the associated cabinet and chassis for mounting the various components of the radio or television receiver; and FIGURE 6 and FIGURE 6A are cross-sectional views indicating alternative means of construction wherein the protective transparent covering for the cathode ray tube screen is shaped flat or to conform to the contours of the cathode ray tube viewing screen and the opening for issue of sound is uninterrupted, or has no spacing means attached to the surrounding cabinet.

Figure 1:
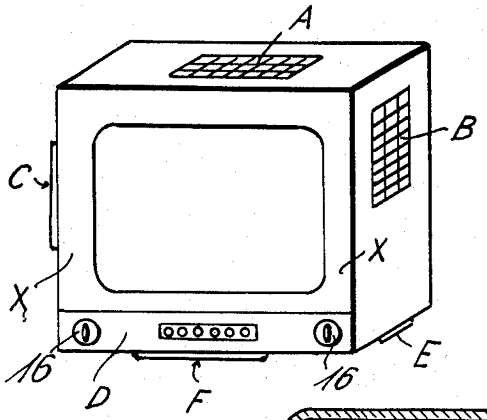

Referring to FIGURE 1, which illustrates the positioning of the various known types of sound reproducers in comparison with and to distinguish them from my invention; sound reproducers in these known methods are placed at positions A, B, C, D, E and F or even at the rear of the television set. Reference numeral 1 represents the cathode ray tube viewing screen.

It is noteworthy that a surrounding sound opaque mask X, X, is provided in all these known systems of sound reproduction. It is this space marked X, X, which is utilized in one, two, three or on all sides for the reproduction of sound emanating from the television set in my invention.

Figure 2:
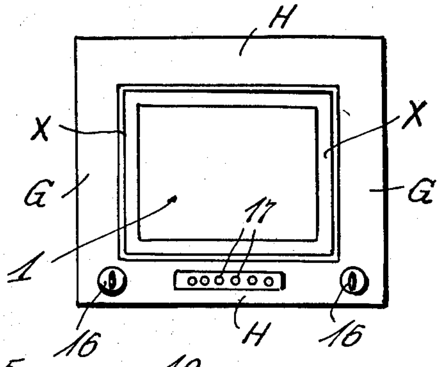
FIGURE 2 is a front elevation view of a television set to indicate further differentiation of my invention from several other already known means in existence as employed by set manufacturers throughout the entire world.

At FIGURE 2, I have shown a different form of system used for sound reproduction in known systems, wherein the sound reproducers are placed at G, G, at H, H, or completely surrounding the television set, which is represented by the cathode ray tube 1 and the opaque masking or surrounding screen indicated by X. It is, therefore, noteworthy that I utilize this position at present occupied by the masking sound-opaque screen marked by position X for the reproduction of sound in my invention.

Figures 3, 4:
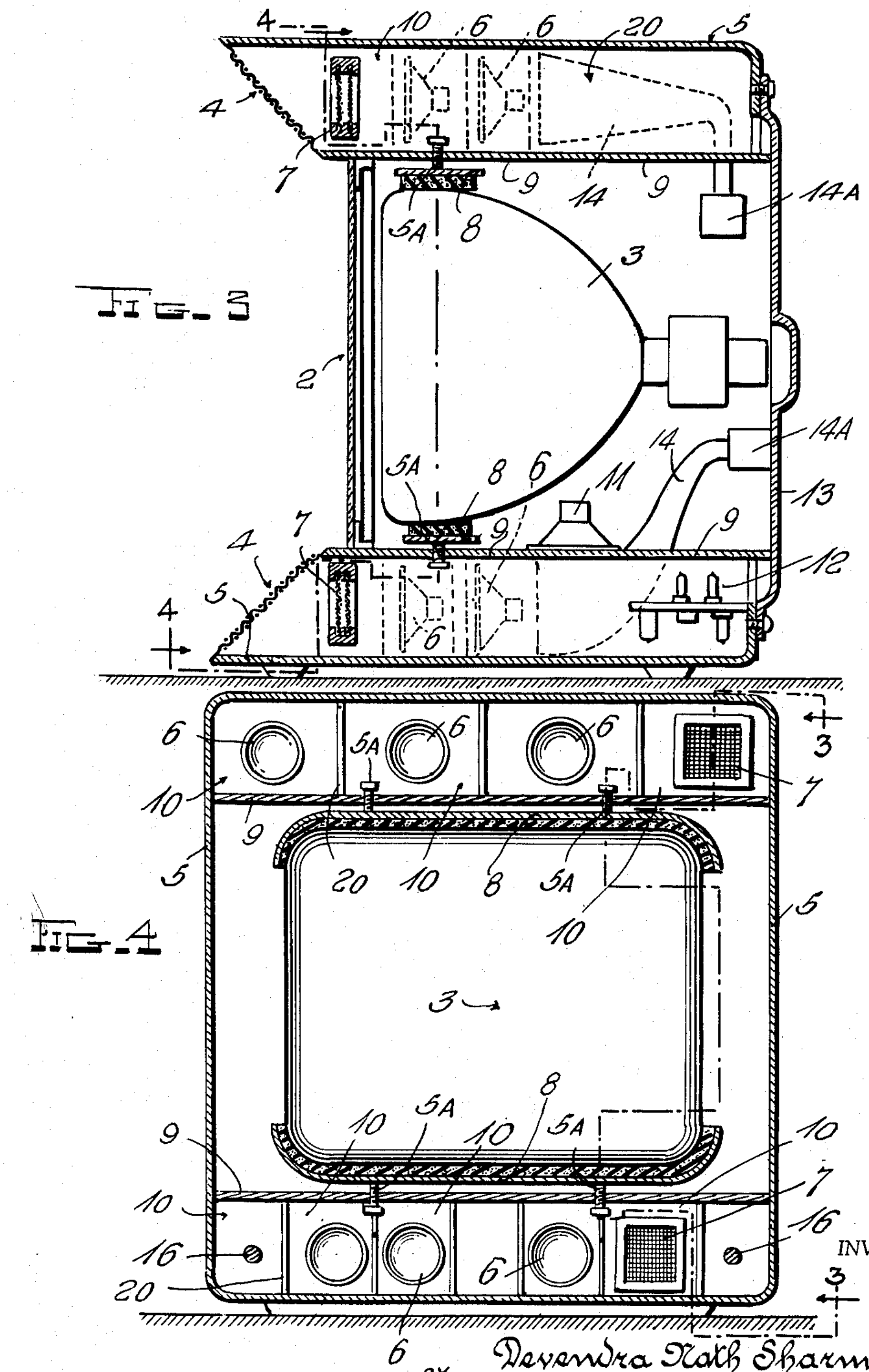
FIGURE 3 is a cross sectional view, taken substantially on line 3—3 of FIG. 4, through a television set cabinet employing my invention and illustrating more clearly the principles and constructional means underlying and incorporated in my invention.
FIGURE 4 is a vertical sectional view taken substantially on line 4—4 of FIGURE 3.

At FIGURE 3, I have illustrated diagrammatically the cross-sectional view of the set constructed according to my invention. 5 represents the outer wooden, plastic, metal or a cabinet constructed by known constructional means; 6 the sound reproducing units; 10 the labyrinth or cavity or space formed by enclosing the cathode ray tube 3 by partition 9 which supports retainer member 8 which is lined with sponge, plastic, felt, or rubber, which holds and retains the cathode ray tube 3 in position alone or assisted by small metal clamps or mounting screws *5a* mounted at suitable intervals. 20 indicates several position spacers or fretwork placed between the cabinet 5 and wall 9 to retain the cathode ray tube in the desired position and to form individual sound cavities; 4 represents the metal or composition perforated gauze for allowing the un-interrupted issuing of sound; 2 represents the flat or curved transparent glass or plastic protective partition mounted to and supported by partition 9 and the separators 20.

It is noteworthy the manner by which the labyrinth 10 can be used in conjunction with forward facing speakers as indicated by 6, or speakers placed at an angle as shown at 11 with curved means for guiding the reproduced sound to the front. Also, alternatively by a horn type of speaker **14*a* and its associated sound guiding flared cavity (exponential or otherwise) 14 leading into the labyrinth 10. By this method the horn type of sound reproducer can be located at any convenient position inside the television set. The sound reproducing apertures, perforations, slots and the like may also be placed as indicated in position 4A** in the diagram of FIGURE 6.

I have also indicated the manner of positioning electrostatic speakers 7. 13 represents the back cover of the set. At 12 is shown the positioning of the various components of the television set preferably on printed type of base boards, by preference totally hidden in the continuation of the walls of the cabinet enclosing the sound reproduction labyrinth 10 at the front end. These panels may be of the plug-in type. By these means the set can be made exceedingly "clean" in appearance inside. These chassis baseboards for mounting the components would also be easily detachable by hinging, plug-in or similar means, enabling easy detachment of these circuit panels for servicing purposes.

At FIGURE 4 I have indicated in vertical section one preferred form of the frontal appearance of the set according to my invention. 3 represents the cathode ray tube viewing screen, while 16 represents the several monitoring controls. 17 in FIGURE 2 represents the press-buttons for changing and selecting the various radio and television channels or frequencies, while 4 in FIGURE 3 represents the perforated surroundings of the television viewing screen according to my invention through which the reproduced sound emanates. Of course, the various monitoring controls may be placed at the top or at the sides of the television set.

At FIGURE 5 I have diagrammatically indicated the construction of the unit method of construction of the cabinet in association with sound reproduction means. 5 represents the outer wooden, plywood, plastic or other composition material cabinet; 19 the metal screening foil; 20 the spacers or separators for separating partitions 5 and 9 constituting the hollow-walled cabinet (one cabinet inside another); and 23 the corner where the hollow "sandwich" of the cabinet can be joined or dovetailed together. 21 represents the printed circuit form of baseboard upon which the several components 22 are mounted. This baseboard 21 is made easily detachable or hinged or easily plugged in or out from the supporting chassis for the easy maintenance of the sets and to give it a very "clean" appearance inside.

At FIGURES 6 and 6A I have indicated the front of the television set and indicated means whereby the transparent protective cover 2 or 26 for the cathode ray tube may be flat or curved. It is also noteworthy as indicated at FIGURE 6A the manner by which the cathode ray tube is made "floating" by springs 27, i.e., mounted directly and supported by the chassis 5 and not by the partition 9 and spacing members 20 of FIGURES 3 and 4.

The materials used may be any form of constructional materials such as plastic, wood, metal gauze, sheet, glass fiber and the like, molded, stamped, die-cast and fabricated to the required shape, or the assembly in several units may be assembled and metal sprayed to act as a screen for undesirable electrical and other type of static interference.

More than one speaker, each possessing a different sound frequency response characteristic and each having its own separate dimensional "horn" cavity, air space, exponential horn and shaped out-let flaring around the cathode ray tube may be utilized, preferably, to render better reproduction of sound and to increase the stereophonic effects.

The facade or the flare of the cavity or labyrinth thus formed around the cathode ray tube facing forward and/or at right angles, may be covered with minutely perforated plastic or similar fabric material as indicated at 4 in pleasing designs to permit the uninterrupted issue of sound from the sound reproducing channels of the labyrinth. Alternatively, the opening of the sound wave-guide around the cathode ray tube or the space between the cabinet and the cathode ray tube (or part of it) which is at present occupied in all television receivers by the sound-opaque mask may be covered with material allowing the passage of sound without any hindrance.

Of course, a speaker unit may be directly coupled to the diaphragm or covering provided at present by the space between the cabinet and the cathode ray tube and/or the transparent covering of the C.R.T. I have in mind a reed type or the latest type of electrostatic speakers which lend themselves to be shaped to any desired form.

While I have described my invention in certain of its preferred embodiments I realize that modifications may be made and it is understood that no limitations upon my invention are intended other than may be imposed by the scope of the appended claims.

What I claim is:

1. In a television receiver having a cathode ray tube forming a viewing screen and a rectangular cabinet surrounding the viewing screen in relatively closely spaced relation to the rectangular margin thereof, the improvement comprising upper and lower horizontal partition walls spanning the cabinet transversely intermediate the side walls and spaced from the top and bottom walls of the cabinet and being closely adjacent the top and bottom margins of said viewing screen, secondary partition walls connected between said first mentioned partition walls and the top and bottom walls of the cabinet and extending from the back to the front of the cabinet, said first mentioned partition walls, said secondary partition walls and the top and bottom walls of the cabinet forming a multiple number of forwardly-opening vertically narrow sound-conveying passages closely adjacent the top and bottom margins of the viewing screen and spanning the cabinet transversely and extending substantially from the back to the front of the cabinet, individual sound-reproducing means connected with each of said multiple number of sound-conveying passages whereby sound is directed forwardly from each individual sound-reproducing means, and certain of said individual sound-reproducing means comprising electrostatic speakers positioned in said sound-conveying passages forwardly of the viewing screen.

2. In a television receiver as set forth in claim 1, the combination including a transparent protective implosion guard positioned in overlying relation to the viewing screen and contoured to the shape of said viewing screen and having an inturned edge portion engaging at least the top and bottom margins of said viewing screen for connecting said guard thereto, and means connecting said implosion guard intermediate said upper and lower partition walls for supporting the forward end of the cathode ray tube intermediate the sound-conveying passages and providing maximum viewing area of said viewing screen.

3. A television receiver as set forth in claim 1, and vertical side partition walls spanning the cabinet transversely and connected intermediate said upper and lower partition walls and spaced from the side walls of the cabinet and being closely adjacent the side margins of said viewing screen, said side partition walls with the side walls of the cabinet forming a pair of horizontally narrow sound-conveying passages having front openings closely adjacent the side margins of the viewing screen and spanning the cabinet transversely and extending substantially from the back to the front of the cabinet, and sound-reproducing means connected to said horizontally narrow sound-conveying passages for directing sound forwardly from around the perimeter of the viewing screen toward the viewer.

4. In a television receiver having a cathode ray tube forming a viewing screen and a cabinet whose outer walls surround the viewing screen in relatively closely spaced relation to the rectangular margin thereof, the improvement comprising upper and lower horizontal partition walls connected interiorly of the cabinet intermediate the side walls and spanning the cabinet transversely and spaced from the top and bottom walls of the cabinet and being closely adjacent the top and bottom margins of the viewing screen, vertically adjustable resilient mounting clamps connected to said partition walls and disposed between said partition walls and the cathode ray tube and engaging the same for supporting said tube on said partition walls, said partition walls forming with the top and bottom walls of the cabinet a pair of vertically narrow sound-conveying passages having front openings closely adjacent the top and bottom margins of the viewing screen and spanning the cabinet transversely and extending substantially from the back to the front of the cabinet and somewhat forwardly of the viewing screen, sound-reproducing means connected to said sound-conveying passages for directing sound forwardly therefrom around the perimeter of the viewing screen, and certain of said sound-reproducing means connected to said sound-conveying passages forwardly of the viewing screen.

5. In a television receiver as set forth in claim 4, the combination including a support member carrying television receiver circuit components mounted in at least one of said sound-conveying passages.

References Cited in the file of this patent

UNITED STATES PATENTS

| | | |
|---|---|---|
| 2,547,447 | De Boer | Apr. 3, 1951 |
| 2,565,327 | Shaw | Aug. 21, 1951 |
| 2,627,067 | Rose | Jan. 27, 1953 |
| 2,808,121 | Goettner | Oct. 1, 1957 |
| 2,815,087 | Delort | Dec. 3, 1957 |

FOREIGN PATENTS

| | | |
|---|---|---|
| 448,653 | Great Britain | June 12, 1936 |
| 735,402 | Great Britain | Aug. 17, 1955 |
| 773,321 | Great Britain | Apr. 24, 1957 |